United States Patent Office 3,708,352
Patented Jan. 2, 1973

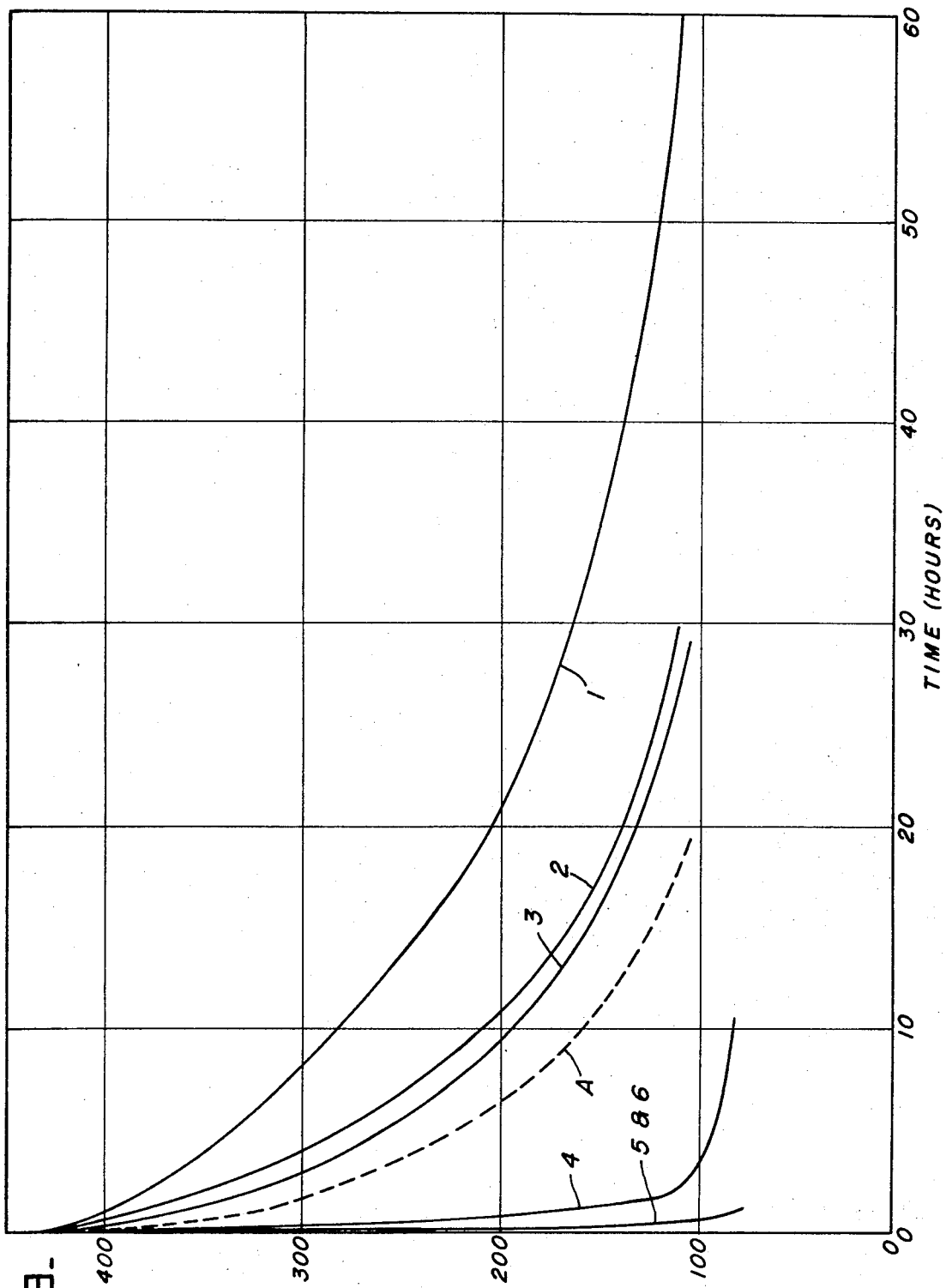

3,708,352
STRAIN HARDENED ALUMINUM-MAGNESIUM
ALLOYS
Robert H. Brown, Natrona Heights, Melvin H. Brown, Leechburg, and Murray Byron Shumaker, Lower Burrell, Pa., assignors to Aluminum Company of America, Pittsburgh, Pa.
Continuation-in-part of application Ser. No. 755,315, Aug. 26, 1968. This application June 14, 1971, Ser. No. 152,688
Int. Cl. C22f 1/04
U.S. Cl. 148—11.5 A                14 Claims

ABSTRACT OF THE DISCLOSURE

Aluminum alloy plate containing 4.4 to 10% magnesium and strain hardened to improve its strength to a level of at least 40% greater than the strength in the annealed state is imparted with substantial freedom from susceptibility of exfoliation corrosion. The process includes rolling at minimum temperatures of about 420° to 650° F. depending on the amount of magnesium present, to produce the strain hardened product and cooling at specially controlled rates.

---

This is a continuation in part of United States Ser. No. 755,315, filed Aug. 26, 1968 and now abandoned.

BACKGROUND OF THE INVENTION

Aluminum alloy plate and sheet products containing magnesium in amounts of 4.4 to 10% as the principal strengthening constituents have achieved considerable acceptance because of the ease with which they can be fabricated into useful structures and their relatively high strength. Such products are employed widely in applications of varying severity such as moderate sized seacraft along with hovercraft. The strength of these materials can be improved if some amount of strain hardening is imparted in the fabrication cycle. If this strain hardening effect is achieved by cold working annealed material, considerable strength improvement results. However, the cold worked material generally develops excessive susceptibility to stress corrosion cracking and exfoliation corrosion especially after extended periods of time even under normal atmospheric conditions. It was subsequently discovered that if the temperature of rolling were increased somewhat, to levels typically above 400° F., a considerable amount of strain hardening could be achieved along with the associated strength gains. In this condition the material is more stable than the cold worked material, but still exhibits a level of susceptibility to exfoliation corrosion that is presently considered to be excessive in that severe deterioration is often exhibited after as little as one year's service in some aggressive environments such as sea water. This susceptibility seriously hinders the use of this material.

In the ensuing discussion, reference is made to the figures in which:

FIG. 9 is a plot of temperature versus elapsed time for the illustrative examples.

At this point, some discussion is warranted regarding the different types of corrosion which can occur in a material of the type under consideration. The most common type of corrosion in aluminum alloys is the pitting type in which pits occur over the surface of a metal plate or the like. This type of corrosion involves the formation of small craters because of more rapid corrosion at certain sites than on the remainder of the surface. This type of attack can be alleviated by the application of a protective coating. For instance, craft operating in sea water can be protected from further pitting corrosion by the application of suitable paints or other coatings. A modification of pitting corrosion occurs where there is some undercutting of the metal surface around the pits. That is, the corrosion advances by undermining parallel to the surface of the pit origin. This frequently results in some amount of blistering of the metal around the point of the pit inception. In general, this type of pitting corrosion can be arrested to some extent by the application of protective surface coatings. In exfoliation corrosion, however, the application of surface coatings is of limited value and sometimes almost entirely useless since this form of corrosion involves a progressive delamination parallel to the metal surface. This delamination is produced by the formation of corrosion products resulting from more rapid corrosive attack of the metal between the surface strata than at the surface itself. This can be likened to a series of overlapping blisters progressing several layers beneath the metal surface. Since the most harmful attack occurs beneath the metal surface, a coating will not insure protection of subsurface layers.

Figure 1:
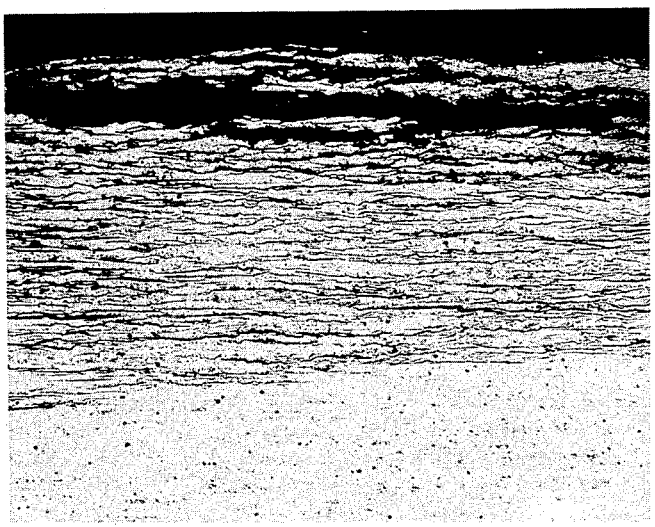
FIG. 1 is a photomicrograph at 100× magnification illustrating exfoliated plate.

Exfoliation corrosion is illustrated by the photomicrograph shown in FIG. 1. This photomicrograph was taken at a magnification of 100× of a specimen taken at a section through the thickness of the plate and along the direction of rolling, the specimen being etched in a solution containing 40% $H_3PO_4$. Referring to FIG. 1, it becomes readily apparent that this type of corrosion severely deteriorates the material which exhibits a plurality of delaminated strata. This condition renders the application of protective surface coatings quite useless because of the lack of any sound metal support.

Figure 3:
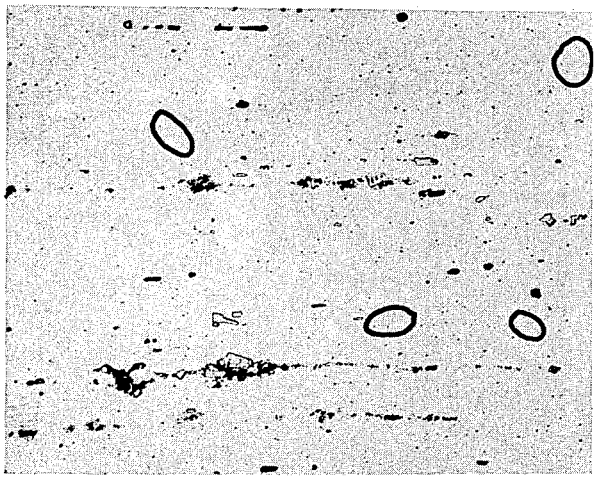
FIG. 3 is a photomicrograph at 500× magnification illustrative of improved plate produced by the improved method.
Figure 2:
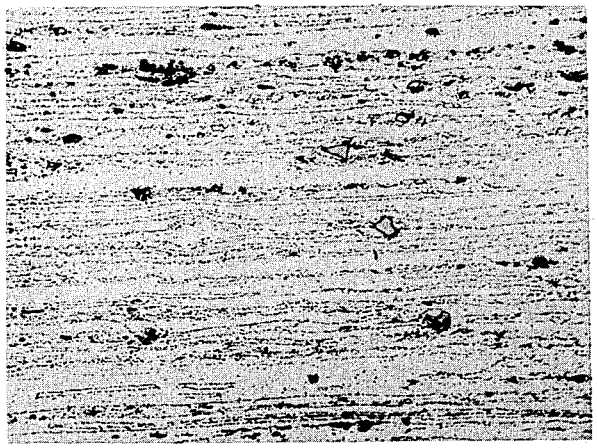
FIG. 2 is a photomicrograph at 500× magnification illustrative of plates produced by the prior practice.

It is believed that the susceptibility to exfoliation in the described plate or sheet products is related to the amount and pattern of any magnesium-bearing precipitate particles through the metal cross section. Referring now to FIGS. 2 and 3, there are shown two different conditions with respect to magnesium-bearing precipitate. In FIG. 2, there is a pattern of precipitate which is not random but rather describes preferential or directional paths in the general direction of working along grain boundaries and slip planes or other crystallographic planes and which precipitation pattern is quite dense. This directional and dense pattern of Mg-bearing precipitate that is related to crystallographic features contributes greatly to the material's susceptibility to exfoliation corrosion. If the material exhibits this type of non-random and dense precipitate pattern, it will be quite susceptible to exfoliation and severe blistering types of corrosion. If the material exhibits a pattern such as shown in FIG. 3 where the Mg-bearing precipitate is clearly random and not disposed in preferential patterns and additionally is rather sparse, the material's susceptibility to exfoliation is eliminated or reduced to a negligible level. In one practice according to the invention, the material is imparted with substantial freedom from Mg-bearing precipitate or a precipitate pattern corresponding to that shown in FIG. 3 wherein, under a magnification of 500×, a photomicrograph of a section through the thickness and along the direction of rolling reveals an internal structure which exhibits substantial freedom from Mg-bearing precipitate or not more than 50 Mg-bearing precipitate particles per square inch of the micrograph and to the extent any precipitation prevails its distribution is substantially completely random by which is meant substantial freedom from preferential or directional characteristics. In other embodiments more Mg-bearing precipitate particles are formed but they are still distributed in a random pattern free of closely arranged particles describing continuous particle paths or planes parallel to the direction of rolling.

According to the present invention, exfoliation corrosion together with any excessive undermining or blistering types of corrosion are alleviated in aluminum alloy rolled products, including sheet and plate, containing 4.4 to 10% magnesium which plate products are imparted with sufficient strain hardening to increase their strength by at least 40% over the strength of like material in the annealed temper. The annealed temper or condition refers to the substantially completely recrystallized condition where the internal structure is substantially free of strain hardening effects. According to one preferred embodiment of the improved method, the aluminum alloy is strain hardened by rolling at temperatures of 400° to 650° F. or more, depending on the magnesium content, the rolling temperature being in accordance with the values of $T_r$ shown in FIG. 4, a plot of $T_r$ versus magnesium content. This rolling is described as a warm rolling and results in a considerable amount of strain hardening with relatively little risk of cracking during the rolling operation. After warm rolling, the preferred embodiment contemplates that the plate product is cooled at a rate which is controlled so that once the temperature goes below $T_r$, the cooling proceeds, speaking in the simplest terms, as shown in FIG. 5, a plot for various magnesium contents of the metal temperature versus elapsed time after exiting the rolling operation and covering the temperature range from $T_r$ down to $T_m$. $T_m$ is the lower end of the temperature range ($T_r$–$T_m$) through which the material must be subjected to the controlled cooling. $T_m$ varies depending on the magnesium content in accordance with the relationship shown in FIG. 6. In the range of $T_r$ down to $T_m$, one embodiment of the invention contemplates that, for any elapsed time $t$, the temperature T not exceeding the value shown in FIG. 5.

While other embodiments of the invention described hereinafter allow for some deviation from this specific procedure, the invention might be more conveniently described and perhaps most easily understood at this point in the description in terms of this least complicated but somewhat restrictive expression of the controlled cooling practice of the improved method.

The alloy composition contemplated by the invention, broadly speaking, contains at least 85% aluminum and 4.4 to 10% magnesium. The narrow range for magnesium is 5 to 7% magnesium. While silicon and iron are considered impurities and should not be present in amounts exceeding, respectively, 0.3% and 0.5%, it is sometimes desirable that the alloy contain 0.05 to 0.15% silicon along with 0.1 to 0.25% iron since such improves the strength of the alloy sheet or plate. The alloy can also contain for additional strength and for grain refining purposes up to 1% manganese, for instance 0.1 to 1% Mn, up to 0.4% chromium, for instance 0.1 to 0.4% Cr, up to 0.2% zirconium, up to 0.2% titanium and up to 0.01% boron. By way of other additions, the alloy may also contain up to 2% zinc, up to 2% nickel, up to 0.2% vanadium, up to 0.2% tungsten, up to 1% cobalt, or up to 0.15% molybdenum. Where elements in addition to magnesium are introduced into the alloy, the total of such additions preferably should not exceed 3%. Copper is considered an impurity which should be limited to 0.2% maximum and preferably 0.1% maximum.

A typical fabrication sequence commences with the production of an ingot having the desired composition. The ingot is preferably produced by a continuous casting process and may typically be about 12 inches thick after scalping. The ingot is heated for about 24 hours at a temperature of 900° F. or higher to improve the homogeneity of the distribution of the various alloying constituents. The metal is hot rolled at a temperature of about 750° F. to produce a slab of approximately 4 inches in thickness. The material is next strain hardened by warm rolling to produce a rolled product in the form of plate varying typically in thickness from ¼ to 3 inches but as thin as ⅛ inch. This strain hardening may be accomplished by rolling at temperatures which range from about 420° to 650° F. depending on the magnesium content in accordance with the values shown in FIG. 4, a plot of temperature $T_r$ versus magnesium content. In one preferred embodiment the rolling temperature $T_r$ referred to is the temperature at which the plate or sheet product emerges from the rolling operation, that is, the roll exit temperature. Other embodiments explained hereinafter contemplate cooling below $T_r$ during or even before rolling but under the herein prescribed controlled conditions. To achieve a minimum roll exit temperature of $T_r$, it is generally necessary to first heat the material up to a higher temperature so that any temperature decrease during rolling does not allow the material to be rolled at less than $T_r$. The rolling operation must be such as to impart a considerable amount of strain hardening so as to increase the strength of the rolled product to a level which represents an increase of at least 40% over the yield strength of the material in the annealed condition. In this respect, improvements of 60% to 100% are often achieved without any troublesome difficulties. In rolling, it is often advisable to avoid heating the metal too far above $T_r$ so as to impair the strain hardening effect. For instance, considering a typical case of an aluminum alloy of the type herein described and containing about 5% magnesium and .7% manganese, it might exhibit a yield strength of 18,000 p.s.i. in the annealed condition. This material in accordance with a preferred embodiment of the invention is strain hardened at a temperature $T_r$ of at least slightly over 450° F. to produce a strain hardened product having a yield strength of at least 25,000 p.s.i. to achieve the required 40% yield strength improvement. At a roll exit temperature of about 460°, a reduction of about 50% during the warm rolling operation results in a sufficient strain hardening condition to increase the yield strength to about 35,000 p.s.i., an increase of almost 100% over the annealed strength.

According to the described preferred embodiment, as the product exits the rolling operation, the controlled cooling practice described herein should be promptly initiated for best results. Expressed in the simplest and narrowest terms, the temperature for any elapsed time after exiting the rolling operation must not exceed that shown in FIG. 5, a plot of elapsed time in hours versus T° F. Speaking more broadly and referring again to FIG. 5, the invention contemplates that the product is cooled in such a manner that, for any elapsed time, the cooling rate is not less than that indicated by the slope of the curve. For magnesium contents which fall between the curves in FIG. 5, a substantially linear interpolation may be made to provide the maximum temperature or minimum cooling rate for any elapsed time. In broder terms, the invention contemplates cooling in accordance with the following relationship:

$$\Sigma t[0.01(T-50)]^n \leq K \qquad \text{(Equation 1)}$$

where $t$ is elapsed time in hours after exiting the rolls,
$T$ is the temperature in ° F. for the elapsed time, and
$n$ and $K$ are predetermined values which vary depending on the magnesium content in accordance with the following relationship:

$$n = \frac{75}{Mg\%^{1.5}} \text{ and } K = \left[\frac{28}{Mg\%^3} + \frac{5.2 \times 10^8}{Mg\%^{13}}\right] [0.01(T_r - 50)]^n$$

Figure 6:
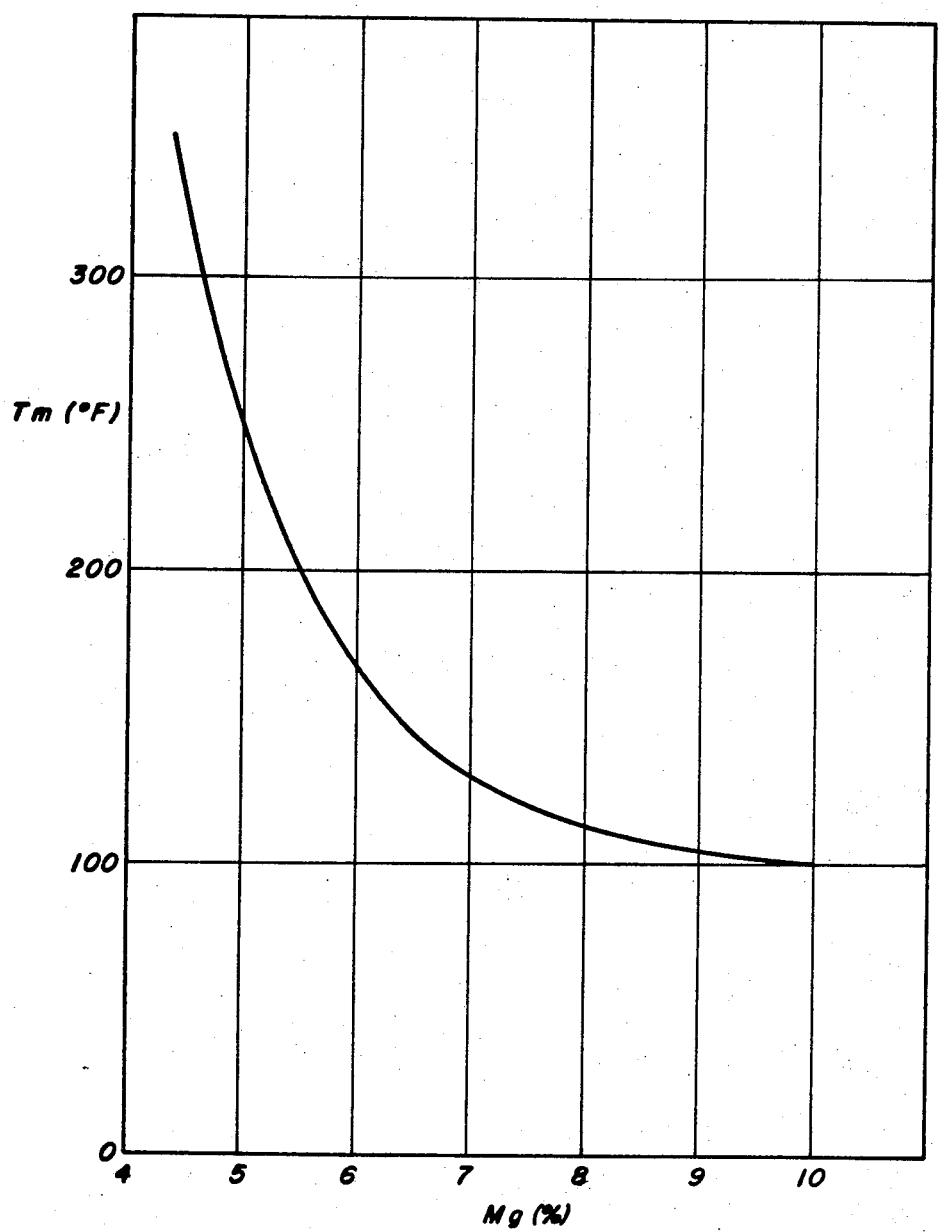
FIG. 6 is a plot of a minimum control temperature $T_m$ versus magnesium content.
Figure 7:
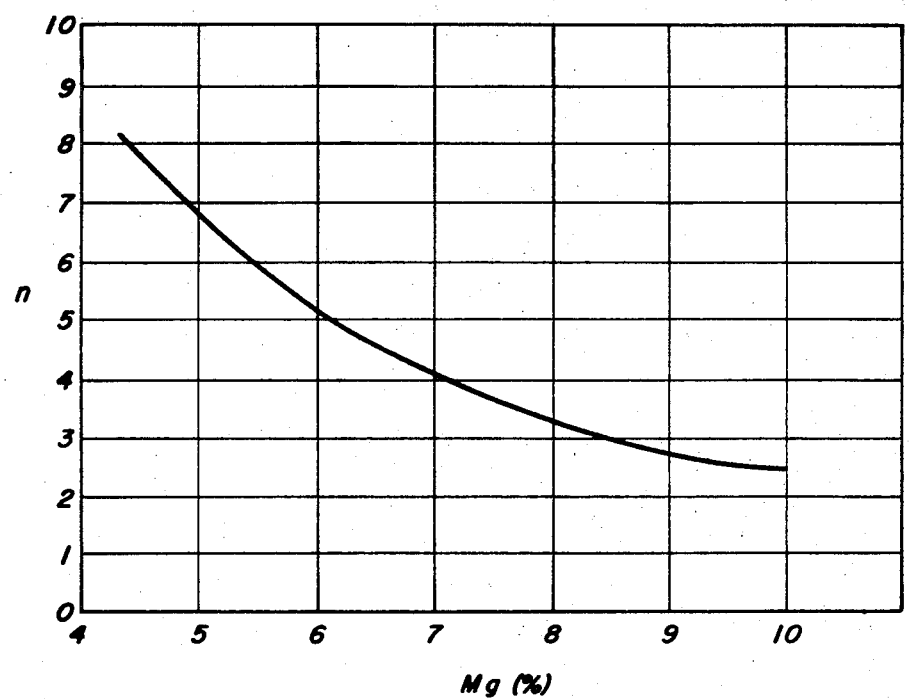
FIG. 7 is a plot showing the value of $n$ for various magnesium contents.
Figure 8:
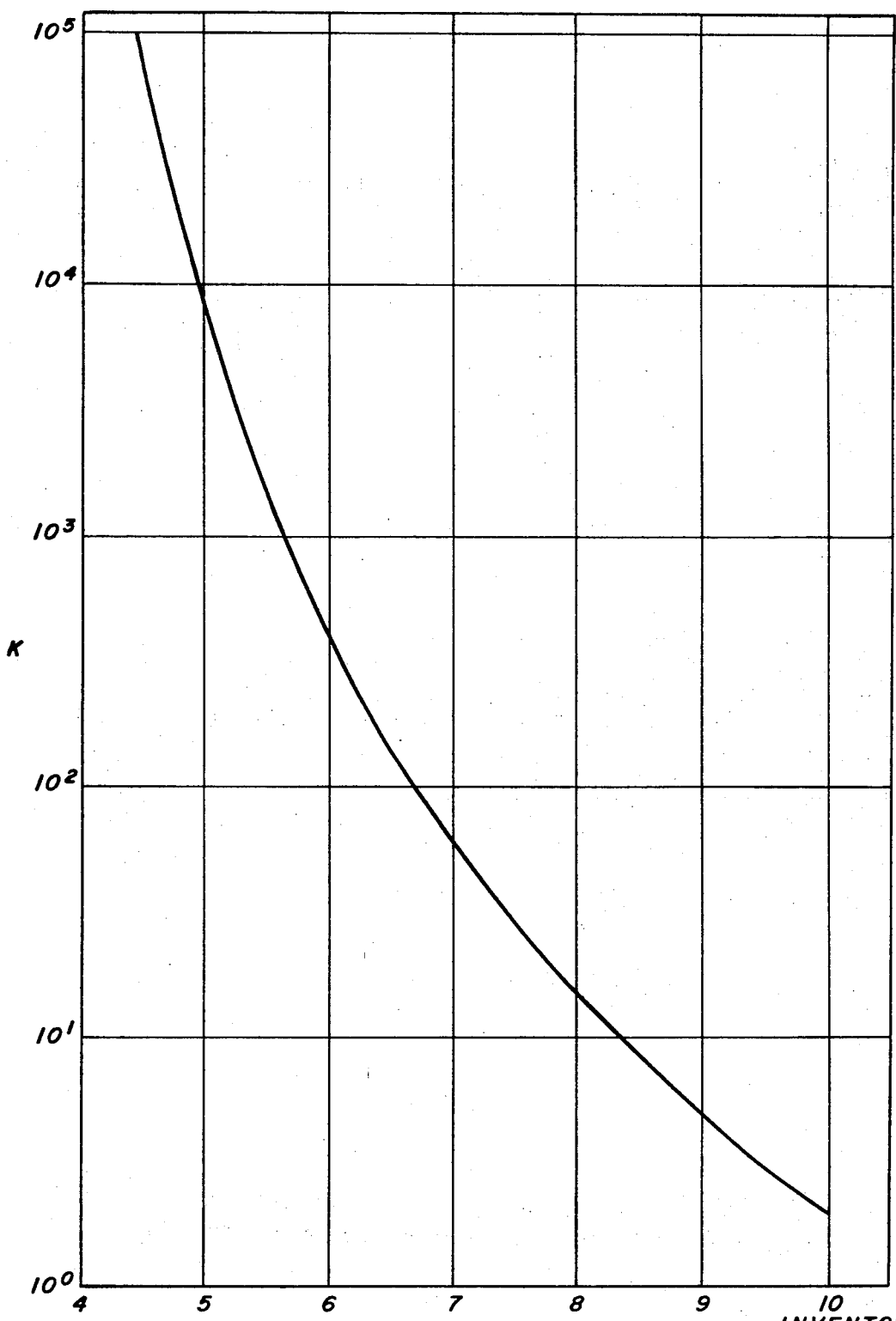
FIG. 8 is a plot showing the value of K for various magnesium contents.

The $n$ and $K$ values are plotted in FIGS. 7 and 8, respectively, in accordance with these relationships. As indicated earlier, $T_r$ is plotted in FIG. 6.

The Equation 1 relationship allows for certain interruptions or variations in the controlled cooling procedure such as might occur in transferring the product from one location to another but does not permit the additive effect of these interruptions or variations to impair the desired result. As stated earlier, the controlled cooling is effected over the temperature range of $T_r$ down to $T_m$ which temperatures vary with magnesium content in accordance with FIGS. 4 and 6. This range for the controlled cooling applies to all embodiments of the invention. Above $T_r$ or below $T_m$, the material can be held or allowed to cool in any desired or convenient manner.

The controlled cooling can be accomplished by an air quench or any other form of cooling, preferably forced cooling. The invention contemplates, for instance, an air or water quench which heretofore would not be considered to impart any particular advantage in strain hardened material of the type described herein since quenching is normally associated with heat treatable materials.

The plate products produced in accordance with the preferred embodiment of the invention described above normally contain very little magnesium-bearing precipitate particles as revealed by micrographic examination. Micrographs taken from the improved plate products typically exhibit not more than 50 particles of Mg-bearing precipitate per square inch of a photomicrograph at a magnification of 500× of a section through the thickness and along the direction of rolling. For instance, referring to FIG. 3, which is a photomicrograph at a magnification of 500× of an alloy plate containing 5.5% nominal magnesium and produced as provided herein, it can be seen that there is very little magnesium-bearing precipitate particles, about 25 particles per square inch. It should be pointed out in FIG. 3 that the magnesium-bearing particles are typified by those encircled. The other larger precipitate particles which prevail about equally in FIGS. 2 and 3 are those of the constituent variety, that is those which evolve in casting and which do not occur during fabrication. It should also be noted in FIG. 3 that, to the extent the magnesium-bearing precipitate occurs, it is free of any preferential or directional characteristics. As explained further hereinbelow other embodiments of the invention can result in a greater amount of precipitate than shown in FIG. 3 but it is distributed in a completely nonpreferential and substantially random pattern. This can be contrasted to a micrograph of plate fabricated in the conventional manner wherein no controlled cooling is effected. For instance, referring to FIG. 2, which is a photomicrograph of conventionally fabricated plate, it can be seen that there is a very considerable amount of magnesium-bearing precipitate particles and of greater significance that the particles are disposed in highly directional or preferential patterns. It is immediately apparent that the particles describe paths or planes generally along the direction of rolling. When subjected to exfoliation tests, the previous material, which exhibits the precipitation pattern typified by FIG. 2 will fail in a relatively short period of time, often a matter of weeks. The improved material, typified by the precipitation pattern shown in FIG. 3, on the other hand, will consistently withstand an exfoliation-promoting environment.

To illustrate the practice of the invention and the advantages achieved thereby, the following examples proceed. Several plates about ¼ inch thick were fabricated from an aluminum alloy containing nominally 5.5% Mg and 0.7% Mn. In the fabrication cycle, each plate was heated to a temperature of 600° to 680° F. and warm rolled at a roll exit temperature of about 480° F., a little over the 476° $T_r$ determined from FIG. 4. The rolling effected a reduction of about 50% to impart sufficient strain hardening to increase the yield strength to about 35,000 p.s.i., an 84% increase over the annealed strength of 19,000 p.s.i. After exiting the rolls, the plates were cooled in the manner designated in the footnotes to Table I. The cooling curves for the various cooling procedures are shown in FIG. 9 where the curve identification number refers to the run number in Table I. Photomicrographs were taken at a magnification of 500× of specimens removed from each plate after cooling and examined for precipitate density and pattern. In addition, exfoliation corrosion tests were performed on specimens removed from each plate. The exfoliation test here consisted of subjecting specimens to alternating exposures to salt water spray and high humidity air. In this test, specimens of each plate are mounted in a tank at an angle of approximately 45°. The tank is maintained at a temperature of 120° F. throughout the test. The test cycle consists of a 30-minute salt solution spray followed by soaking for 1½ hours in air at 100% relative humidity. The salt solution consisted of 41.935 grams of synthetic sea salt per liter of water buffered to a pH of 3.0 with a 1% aqueous solution of acidic acid. The synthetic sea salt was in accordance with the American Society of Testing Materials standard D–1141–52 entitled "Sea Salt." The test was run continuously for two weeks. A specimen was considered to pass a test if it exhibited substantially no blistering or exfoliation corrosion although some relatively small amount of isolated or localized pitting was considered allowable. The specimens were considered as failing this test if they exhibited any amount whatsoever of exfoliation corrosion or any significant amount of blistering. Table I sets forth the cooling procedures together with the results of the exfoliation tests and the precipitate condition as determined in the examination of the micrograph. Also listed for each test is the value of $K$ as determined in accordance with Equation 1. For this particular material, $K$, in accordance with the invention, must be equal to or less than $1.35 \times 10^3$. All the materials passed an alternate immersion stress corrosion cracking test which verifies the advantages of warm rolling in this connection.

TABLE I

| Run No. | Cooling procedure | Precipitate condition | Exfoliation test | K |
| --- | --- | --- | --- | --- |
| 1 | A | Dense, directional | Fail | $6.78 \times 10^3$ |
| 2 | B | do | do | $2.52 \times 10^3$ |
| 3 | C | do | do | $1.94 \times 10^3$ |
| 4 | D | Sparse, random | Pass | $0.38 \times 10^3$ |
| 5 | E | do | do | $0.10 \times 10^3$ |
| 6 | F | do | do | $0.10 \times 10^3$ |

In viewing Table I, it becomes immediately apparent that the plates in samples 1, 2 and 3 where the cooling curves in FIG. 9 were above the curve representative of the practice of the invention, curve A, the specimens all exhibited a dense and directional precipitation pattern and failure in the exfoliation tests. It is also apparent that specimens 4 through 6, which are within the practice of the invention, exhibited sparse and completely random precipitation and passed the exfoliation tests. Comparing the K values listed in Table I, it can be seen that the values for samples 1, 2 and 3 are somewhat above the value $1.35 \times 10^3$ determined in accordance with Equation 1 and that these specimens all exhibited the undesirable precipitate pattern and attendant exfoliation corrosion acceptability associated therewith. On the other hand, the K values for specimens 4 through 5 were all below that determined by Equation 1 and these specimens all exhibited a very sparse and random precipitate distribution and demonstrated substantial immunity to exfoliation corrosion in the above-described test.

The improvement to this point has been described largely in terms of a preferred embodiment which features rolling only above $T_r$ and which most often results in the preferred microstructure above identified wherein under a magnification of 500× a photomicrograph of a second through the thickness of the plate product and along the direction of rolling reveals substantial freedom of Mg-bearing precipitate particles in excess of 50 per square inch of the micrograph. This practice is preferred as conferring maximum resistance to stress corrosion cracking and to exfoliation corrosion.

Another highly useful embodiment contemplates some cooling during or even before the warm rolling operation provided the cooling proceeds according to the above set forth controls and provided further that the temperature of the metal body during rolling does not go below $T'_r$ as defined in FIG. 4. If the temperature of the metal goes below $T'_r$ excessive cold working effects are encountered which, while possibly beneficial to strength, drastically reduces the advantages of the improvement with respect to stress corosion cracking resistance and exfoliation corrosion resistance, especially the former. That is, according to the improvement, it is absolutely essential that the strain hardening imparted to the plate product be warm strain hardening and not cold strain hardening and this is why it is important that the minimum temperature $T'_r$ of the metal during rolling operations be controlled. In the warm strain hardening contemplated there is some amount of partial strain relaxation substantially commensurate with strain formation. This somehow gives the plate stability and corrosion resistance which is not readily achieved by cold rolling with or without a subsequent separate thermal treatment to induce partial strain relaxation. While the temperature of the plate rolling stock during rolling should not go below $T'_r$, this is not to be taken as an indication that stock enters the rolling mill at a temperature very close to $T'_r$. Rather it is desirable that metal enter the mill at a temperature close to $T_r$ or above $T_r$ in order to positively assure that the desired warm strain hardening is achieved. Accordingly it is desired that the temperature of the rolling stock entering a rolling mill not be under 75° less than $T_r$. For instance, for an alloy containing about 6% magnesium $T_r$ is 500° F. and the temperature entering the mill preferably should not be less than 425° F., and in any event, not less than 350° F. Thus in accordance with the invention the rolling stock may enter the rolling mill at temperature levels above or below $T_r$ but the temperature of the stock in the mill is not permitted to go below $T'_r$. Further it is quite desirable that the temperature of the rolling stock entering the mill be above $T_r$, or at least not under 75° less than $T_r$.

Also, as stated hereinbefore, the prescribed cooling control must be exerted as the metal temperature goes below $T_r$ during any cooling, be it before rolling, during rolling or after rolling. Under these conditions, cooling in the rolling mill can impart advantages in mechanical strength for given rolling reductions over the previously described conditions where the metal body temperature is maintained above $T_r$ throughout the entire rolling sequence. The strength is accompanied by some slight sacrifice in resistance to stress corrosion cracking and exfoliation corrosion. Nonethless, if the prescribed cooling controls are followed, the plate product exhibits very high levels of resistance to these corrosion effects which levels are quite suitable even for severe applications such as sea vessel hull plate.

Thus, in its broadest sense, the invention contemplates heating aluminum rolling stock to a temperature of at least $T_r$ and warm strain hardening this stock to produce an improved plate product. At some time, of course, it is necessary that the metal be cooled down from $T_r$. Within the above set forth conditions this cooling can occur during rolling, that is in the rolling mill, or after the plate product exits the rolling operation, or a combination of both. Even some amount of cooling below $T_r$ could possibly occur before rolling. What is absolutely essential is that any such cooling be carefully controlled within the prescribed practice of the invention.

The controlled cooling during rolling contemplated by the invention can be accomplished in a number of different manners. Coolant sprays can be situated between rolls or roll passes to flood the metal with copious quantities of coolant. Since rolling mills use lubricants such can often be utilized as coolants. Here greater amounts of lubricant than normally employed can be used to effect the controlled cooling by flooding the metal with copious quantities of lubricant at selected sites. In a typical rolling operation aluminum alloy rolling stock containing 5% magnesium and about 12 inches in thickness is heated to a temperature of about 650° and then rolled down to a plate about one inch thick in a hot reversing mill. During this phase of the rolling operation the temperature of the body may decrease to about 500° which is above $T_r$ of 450° for this alloy. Since the roll exit temperature exceeds $T_r$ the cooling in this mill need not be controlled. The one inch plate is then passed through a continuous mill which may feature four or five stands where it is reduced to plate about three-eights of an inch in thickness. Just before the first stand copious quantities of coolant are applied which reduce the metal temperature to just below 450° F. at an almost instantaneous rate. Additional forced flooding between stands 3 and 4 also assist in lowering the temperature to a level of about 300° at an equally fast rate at which temperature the plate exits the mill. Since the exit temperature is still above $T_m$, about 250° F., further controlled cooling must be effected down to the 250° F. $T_m$ temperature level or lower. A system of sprays can be situated after the last stand in the continuous mill to effect this cooling which again will be practically instantaneous and thus well within the conditions set forth in Equation 1. Conditions can be varied such that a lesser or greater amount of the controlled cooling occurs in the mill.

As a specific example of cooling in the mill as contemplated by the invention two plates approximately ¼ inch in thickness were fabricated in an aluminum alloy containing about 5.25% Mg and about 0.7% Mn. Rolling stock a little more than ¾ inch was heated to a temperature of about 625% F., well above $T_r$ of 465° F. for this alloy, and then rolled in a reversing mill of the type normally used for hot rolling. In the mill copious quantities of coolant were applied such that one plate was at a temperature of 390° F. and the other at 240° F. at final gauge. These temperatures are both above $T_m$, about 220° F. for this alloy. Accordingly, both plates were given two additional passes through the mill without further reduction but with copious quantities of coolant applied such that each exited the mill at temperatures below 160° F. The microstructure of the plate exiting the warm reduction at 240° F. showed a greater amount of precipitate than that exiting at 390° F., mainly as a result of warm strain hardening at lower temperatures. Both had somewhat greater precipitate than shown in FIG. 3 but considerably less than shown in FIG. 2. More significantly, the precipitate pattern in each plate was completely random and completely free of the preferential patterns of paths or planes parallel to the direction of rolling of the type shown in FIG. 2. Both plates passed alternate immersion stress corrosion cracking tests and both passed exfoliation tests. The tensile properties of both plates and of fully annealed plate for comparison are listed below

| Exit temp.,° F. | Strength Y.S. | K s.i., T.S. |
|---|---|---|
| 390 | 42.0 | 54.2 |
| 240 | 53.2 | 60.7 |
| Annealed | 23.0 | 45.0 |

From the foregoing description and examples, it is apparent that the present invention contemplates a new and improved method of producing high strength strain hardened aluminum alloy plate and sheet products containing magnesium which strain hardened products exhibit substantial immunity to corrosion by exfoliation.

We claim:

1. The method of producing aluminum base alloy plate in the warm strain hardened condition and having high resistance to exfoliation corrosion and stress corrosion cracking comprising:
   (a) providing a body of aluminum base alloy containing 4.4 to 10% magnesium,
   (b) warm rolling said body, said body having a rolling temperature as it enters said rolling operation of not less than $T_r$, where $T_r$ varies with magnesium content according to the curve in FIG. 4, to produce a warm rolled plate product, the rolling imparting sufficient warm strain hardening to increase the minimum yield strength of the rolled plate product to a level at least 40% greater than the yield strength of said alloy plate product in the annealed condition,
   (c) any cooling from said rolling temperature being controlled in such a manner that once the metal temperature goes below $T_r$, and while its temperature is above $T_m$, where $T_m$ is in accordance with FIG. 6, the following relation is maintained:

$$et[0.01(T-50)]^n \leq K \quad \text{(Equation 1)}$$

where
   $t$ is elapsed time in hours after the temperature goes below $T_r$
   $T$ is the temperature in ° F. for the elapsed time, and
   $n$ and $K$ are predetermined values which vary depending on the magnesium content in accordance with the following relationships:

$$n = \frac{75}{Mg\%^{1.5}}$$

$$K = \left[\frac{28}{Mg\%^3} + \frac{5.2 \times 10^8}{Mg\%^{13}}\right][0.01(T_r-50)]^n$$

2. The method of producing aluminum base alloy plate in the warm strain hardened condition and having high resistance to exfoliation corrosion and stress corrosion cracking comprising:
   (a) providing a body of aluminum base alloy containing 4.4 to 10% magnesium,
   (b) warm rolling said body, said body having a rolling temperature as it enters said rolling operation of not less than $T_r$, where $T_r$ varies with magnesium content according to the curve in FIG. 4, to produce a warm rolled plate product, the rolling imparting sufficient warm strain hardening to increase the minimum yield strength of the rolled plate product to a level at least 40% greater than the yield strength of said alloy plate product in the annealed condition,
   (c) any cooling from said rolling temperature being controlled in such a manner that once the metal temperature goes below $T_r$, and while its temperature is above $T_m$, where $T_m$ is in accordance with FIG. 6, the cooling is effected at a rate which is never less than the minimum rate shown by the slope of the curve in FIG. 5.

3. The method of producing aluminum base alloy plate in the warm strain hardened condition and having high resistance to exfoliation corrosion and stress corrosion cracking comprising:
   (a) providing a body of aluminum base alloy containing 4.4 to 10% magnesium,
   (b) warm rolling said body, said body having a rolling temperature as it enters said rolling operation of not less than $T_r$, where $T_r$ varies with magnesium content according to tthe curve in FIG. 4, to produce a warm rolled plate product, the rolling imparting sufficient warm strain hardening to increase the minimum yield strength of the rolled plate product to a level at least 40% greater than the yield strength of said alloy plate product in the annealed condition,
   (c) any cooling from said rolling temperature being controlled in such a manner that once the metal temperature goes below $T_r$, and while its temperature is above $T_m$, where $T_m$ is in accordance with FIG. 6, its temperature for any elapsed time after going below $T_r$ is not greater than that shown in FIG. 5.

4. The method of producing aluminum base alloy plate in the warm strain hardened condition and having high resistance to exfoliation corrosion and stress corrosion cracking comprising:
   (a) providing a body of aluminum base alloy containing 4.4 to 10% magnesium,
   (b) heating said body to a temperature of at least $T_r$, where $T_r$ varies with magnesium content according to the curve in FIG. 4,
   (c) warm rolling said body to produce a warm rolled plate product, the rolling imparting sufficient warm strain hardening to increase the minimum yield strength of the rolled plate product to a level at least 40% greater than the yield strength of said alloy plate product in the annealed condition,
   (d) any cooling of said body being controlled in such a manner that once the metal temperature goes below $T_r$, and while its temperature is above $T_m$, where $T_m$ is in accordance with FIG. 6, the following relation is maintained:

$$et[0.01(T-50)]^n \leq K \quad \text{(Equation 1)}$$

where
   $t$ is elapsed time in hours after the temperature goes to below $T_r$
   $T$ is the temperature in ° F. for the elapsed time, and
   $n$ and $K$ are predetermined values which vary depending on the magnesium content in accordance with the following relationships:

$$n = \frac{75}{Mg\%^{1.5}}$$

$$K = \left[\frac{28}{Mg\%^3} + \frac{5.2 \times 10^8}{Mg\%^{13}}\right][0.01(T_r-50)]^n$$

5. The method of producing aluminum base alloy plate in the warm strain hardened condition and having high resistance to exfoliation corrosion and stress corrosion cracking comprising:
   (a) providing rolling stock of aluminum base alloy containing 4.4 to 10% magnesium,
   (b) heating said stock to a temperature of at least $T_r$, where $T_r$ varies with magnesium content according to the curve in FIG. 4,
   (c) warm rolling said stock to produce a warm rolled plate product, the rolling imparting sufficient warm strain hardening to increase the minimum yield strength of the rolled plate product to a level at least 40% greater than the yield strength of said alloy plate product in the annealed condition,
   (d) cooling said stock during said warm rolling to a temperature of not less than $T'_r$, where $T'_r$ is determined from FIG. 4, (e) any cooling of said stock proceeding under conditions such that once the metal temperature goes below $T_r$, and while its temperature is above $T_m$, where $T_m$ is in accordance with FIG. 6, the following relation is maintained:

$$\epsilon t[0.01(T-50)]^n \leq K \quad \text{(Equation 1)}$$

where $t$ is elapsed time in hours after the temperature goes below $T_r$ $T$ is the temperature in °F. for the elapsed time, and $n$ and $K$ are predetermined values which vary depending on the magnesium content in accordance with the following relationships:

$$n = \frac{75}{Mg\%^{1.5}}$$

$$K = \left[\frac{28}{Mg\%^3} + \frac{5.2 \times 10^8}{Mg\%^{13}}\right][0.01(T_r-50)]^n$$

6. The method according to claim 5 wherein said cooling during said warm rolling reduces the temperature of said stock to a level greater than both $T'_r$ and $T_m$ and wherein after said warm rolling said plate product is further cooled under said controlled conditions to a temperature of $T_m$ or less.

7. The method according to claim 5 wherein said controlled cooling is effected by flooding said stock with coolant.

8. The method according to claim 5 wherein, prior to said warm rolling, said stock is cooled to a temperature less than $T_r$ said cooling below $T_r$ occurring under said controlled cooling conditions.

Figure 4:
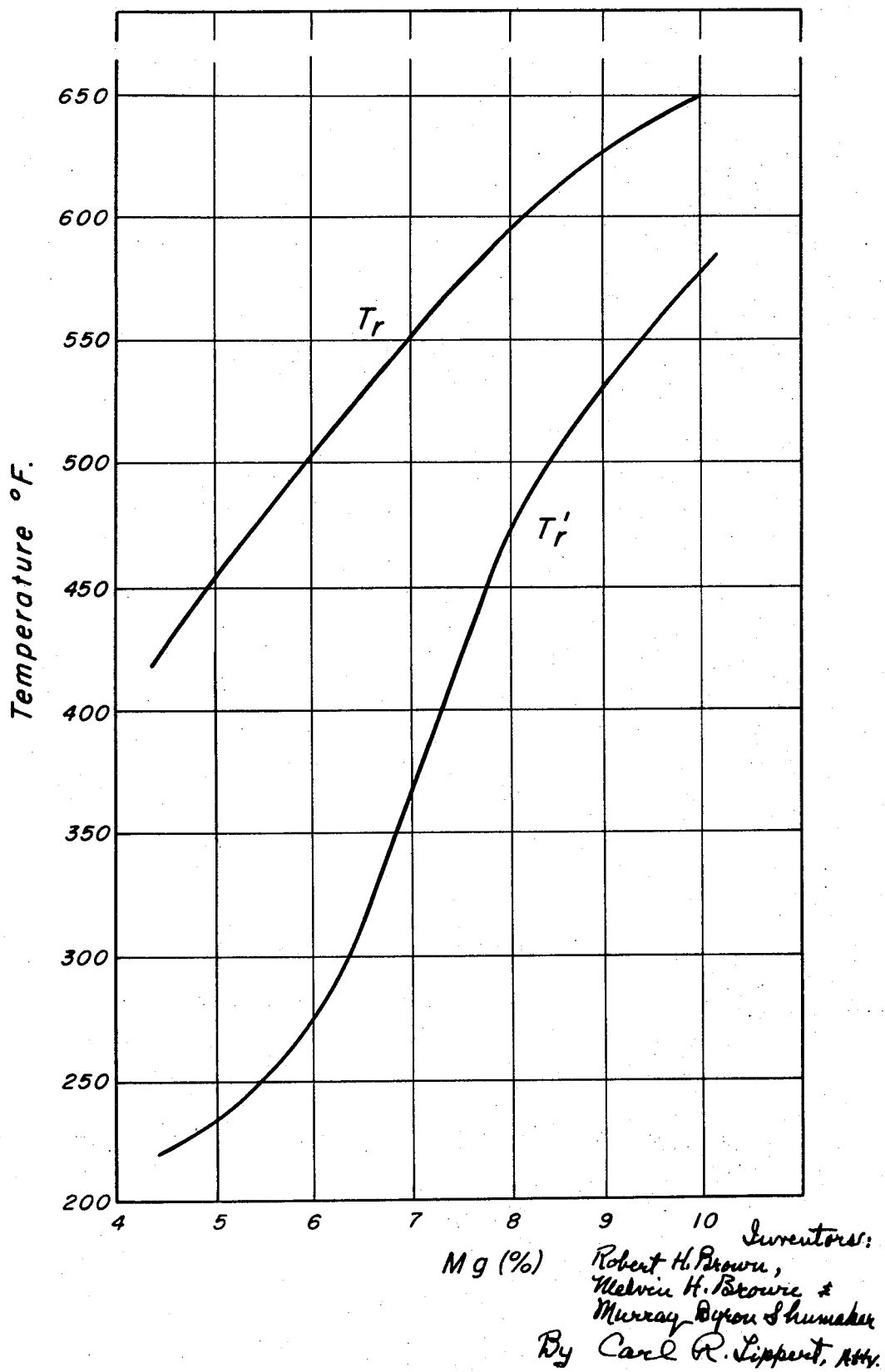
FIG. 4 is a plot of rolling temperatures $T_r$ and $T'_r$ versus magnesium content.
Figure 5:
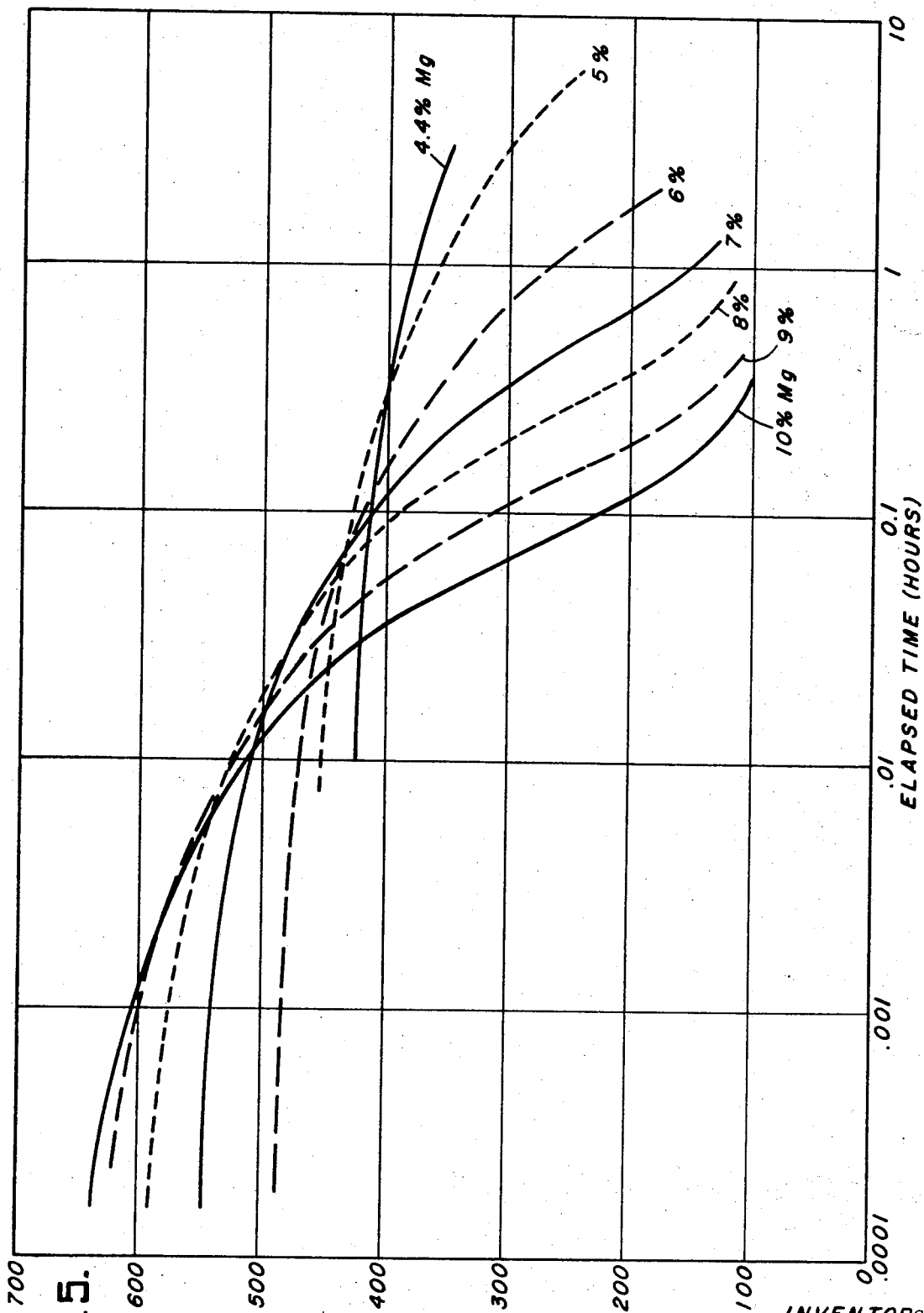
FIG. 5 shows a family of curves for various magnesium contents in a plot of metal temperature versus elapsed time.

9. The method of producing aluminum base alloy plate in the warm strain hardened condition and having high resistance to exfoliation corrosion and stress corrosion cracking comprising:

(a) providing a body of aluminum base alloy containing 4.4% to 10% magnesium, the balance being aluminum and incidental elements and impurities, (b) warm rolling said body to produce a plate or sheet product at a roll exit temperature which is not less than $T_r$, where $T_r$ varies with magnesium content according to the curve in FIG. 4, the rolling imparting sufficient strain hardening to increase the minimum yield strength of the rolled alloy product to a level at least 40% greater than the yield strength of said alloy product in the annealed condition, (c) cooling said alloy product in such a manner that once its temperature goes below $T_r$, and while its temperature is above $T_m$, the cooling is effected at a rate which is never less than the minimum rate shown by the slope of the curve in FIG. 5, thereby to provide an alloy product in the strain hardened temper which product is substantially free from susceptibility to exfoliation corrosion.

10. The method of producing aluminum base alloy plate in the warm strain hardened condition and having high resistance to exfoliation corrosion and stress corrosion cracking comprising:

(a) providing a body of aluminum base alloy containing 4.4% to 10% magnesium, the balance being aluminum and incidental elements and impurities, (b) warm rolling said body at a roll exit temperature which is not less than $T_r$, where $T_r$ varies with magnesium content according to the curve in FIG. 4, the rolling imparting sufficient strain hardening to increase the minimum yield strength of the rolled alloy product to a level at least 40% greater than the yield strength of said alloy product in the annealed condition, (c) cooling said alloy product in such a manner that once its temperature goes below $T_r$, and while its temperature is above $T_m$, its temperature for any elapsed time after exiting the rolling operation is not greater than that temperature shown in FIG. 5, thereby to provide an alloy product in the strain hardened temper which product is substantially free from susceptibility to exfoliation corrosion.

11. A method of producing aluminum base alloy plate in the warm strain hardened condition and having high resistance to exfoliation corrosion and stress corrosion cracking comprising:

(a) providing a body of aluminum base alloy containing 4.4% to 10% magnesium, the balance being aluminum and incidental elements and impurities, (b) warm rolling said body at a roll exit temperature which is not less than $T_r$ where $T_r$ varies with magnesium content according to the curve in FIG. 4, the rolling imparting sufficient strain hardening to increase the minimum yield strength of the rolled alloy product to a level at least 40% greater than the yield strength of said alloy product in the annealed condition, (c) cooling said alloy product in such a manner that once its temperature goes below $T_r$, and while its temperature is above $T_m$, the following relation is maintained:

$$\epsilon t[0.01(T-50)]^n \leq K \quad \text{(Equation 1)}$$

where $t$ is elapsed time in hours after the temperature goes below $T_r$ $T$ is the temperature in °F. for the elapsed time, and $n$ and $K$ are predetermined values which vary depending on the magnesium content in accordance with the following relationships:

$$n = \frac{75}{Mg\%^{1.5}}$$

$$K = \left[\frac{28}{Mg\%^3} + \frac{5.2 \times 10^8}{Mg\%^{13}}\right][0.01(T_r-50)]^n$$

12. The improved plate product produced in accordance with the method of claim 4.

13. The improved plate product produced in accordance with the method of claim 5.

14. The improved plate product produced in accordance with the method of claim 11.

References Cited

UNITED STATES PATENTS

| | | | |
|---|---|---|---|
| 3,346,372 | 10/1967 | Jagaciak | 148—11.5 A |
| 3,556,872 | 1/1971 | Jagaciak | 148—11.3 A |

WAYLAND W. STALLARD, Primary Examiner

U.S. Cl. X.R.

148—12.7

UNITED STATES PATENT OFFICE
CERTIFICATE OF CORRECTION

Patent No. 3,708,352          Dated January 2, 1973

Inventor(s) Robert H. Brown, Melvin H. Brown & Murray B. Shumaker

It is certified that error appears in the above-identified patent and that said Letters Patent are hereby corrected as shown below:

Claim 1, Equation 1       Change "epsilon ($\epsilon$)" to --sigma ($\Sigma$)--

Claim 4, Equation 1       Change "epsilon ($\epsilon$)" to --sigma ($\Sigma$)--

Claim 5, Equation 1       Change "epsilon ($\epsilon$)" to --sigma ($\Sigma$)--

Claim 11, Equation 1      Change "epsilon ($\epsilon$)" to --sigma ($\Sigma$)--

Signed and sealed this 16th day of July 1974.

(SEAL)
Attest:

McCOY M. GIBSON, JR.
Attesting Officer

C. MARSHALL DANN
Commissioner of Patents